6537X
U. B. A. Lange.
Heating Stove.
Patented May 3, 1831.
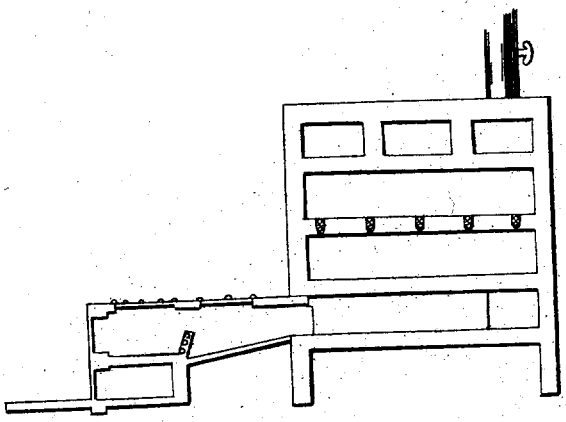
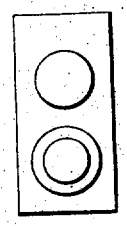
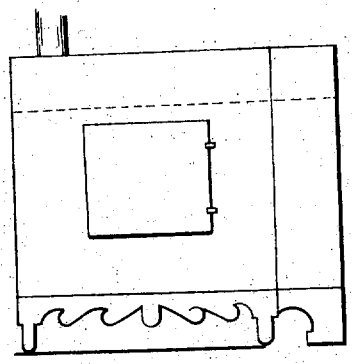
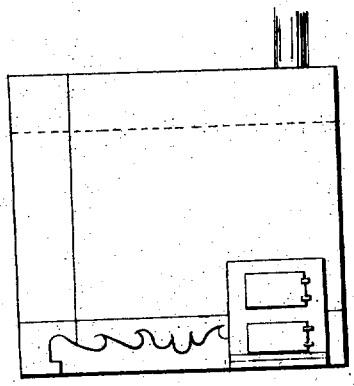
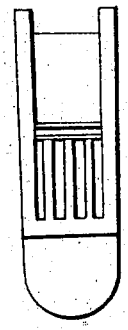
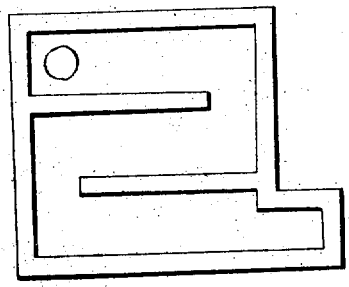
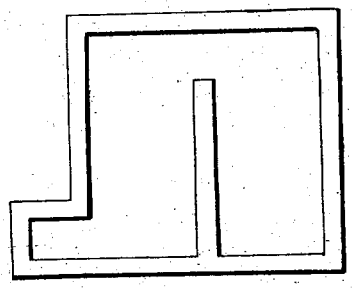

May 3. 1831 6537X 479.

Urban B. A. Lange, of Philadelphia Pennsylvania

Letters Patent.

The schedule referred to in these Letters Patent and making part of the same containing a description in the words of the said Urban B. A. Lange himself of his improvement in the construction of Stove to be heated by burning Stone Coal, To all to whom these presents shall come.

Be it known that I Urban Brum Aaskow Lange of the city of Philadelphia and State of Pennsylvania, have invented a new and useful improvement in the construction of Stoves to be heated by burning Stone Coal, and that the following is a full and exact description of the construction of the said Stove as invented by me.

(The Stove is heated by burning Stone coal in a grate connected with the stove by a horizontal flue entering the stove just above the bottom of the stove, the grate to be permanently enclosed on all sides except the front and so much of the back, as is necessarily left open for the flue, with fire brick stone or plates of iron, in the front are two doors, one immediately in front of the grate and acts as a blower – the other also in front to close the ash hole. In the covering to the grate and flue are openings used as stew holes – closed at pleasure by means of circular plates or pieces of material capable of resisting the destructive effects of heat from the grate. the heat and smoke pass along the flue into a chamber at the bottom of the stove, which chamber is divided by a partition extending nearly the whole length or breadth of the stove, leaving an opening at the extremity through which the heat and smoke pass from the first compartment into a second; and return in the direction of the first entrance, in first compartment, – from the second compartment, the heat and smoke pass into a perpendicular flue, at the corner and on the outside of the stove, and from the last mentioned flue pass into a second chamber at the top of the stove, which chamber is divided into three compartments with passages from one compartment into another left in the partition at alternate ends, so as to form a draught backward and forward and finally for the smoke and heat to pass into an escape pipe piece in the top of the stove. The apartment in which the baking

[illegible]

6537X or other cooking is done, is between the first and second chamber, and is divided there from by plates of iron or slabs of stone, this apartment or oven has an opening at the side or end, fitted closely with a common oven door of iron, the oven may at the option of the owner be divided horizontally by bars or plates of iron on which the articles to be baked or cooked rest so as to increase the capacity of the oven, The Stove is constructed of brick, stone or iron, or so much of either as may suit the view of the proprietor. What I claim as new, and as my own invention or discovery is the construction of the said Stove, and the application of Stone coal to heat the same. Explanation of the Drawing of the above said Stove herewith annexed.

No. 1 side view of the grate & flue of the same

No. 2. Side view of the Stove

" 3. View of interior of the grate

" 4. Bottom plate of Stove or the bottom and partition of the first chamber divided into two compartments and part of perpendicular flue connected therewith the opening marked A shews the space in which the flue from the grate is to be fitted.

" 5. Shews the top plate of second chamber with its three compartments, and top of perpendicular flue reversed that is to say the inside " 6th. The top plate or covering of the grate - and the stew holes.

" 7. A view of the stove on that side in which the oven door is placed

" 8. A full front view B. & C. represent the two doors in front of the grate No. 1. and D the escape pipe Witnesses
Thos. Cooper
William Milnor Urban B. S. Lange.

Ex.d
A.J.W.